(12) United States Patent
Rescate

(10) Patent No.: US 8,051,804 B1
(45) Date of Patent: Nov. 8, 2011

(54) TOILET TRAINING DEVICE FOR PETS

(76) Inventor: Rebecca Rescate, Morrisville, PA (US)

( * ) Notice: Subject to any disclaimer, the term of this patent is extended or adjusted under 35 U.S.C. 154(b) by 0 days.

(21) Appl. No.: 12/651,370

(22) Filed: Dec. 31, 2009

(51) Int. Cl.
A01K 1/035 (2006.01)
(52) U.S. Cl. ........................................................ 119/162
(58) Field of Classification Search .......... 119/161–163, 119/165
See application file for complete search history.

(56) References Cited

U.S. PATENT DOCUMENTS

| | | | | | |
|---|---|---|---|---|---|
| 2,676,331 | A | * | 4/1954 | Inman | 4/239 |
| 3,688,742 | A | | 9/1972 | McGee | |
| 3,757,738 | A | * | 9/1973 | Hall | 119/162 |
| 4,181,988 | A | * | 1/1980 | Skaggs | 4/237 |
| 5,103,772 | A | * | 4/1992 | Schmid | 119/162 |
| 5,787,514 | A | * | 8/1998 | Erli | 4/239 |
| 6,014,946 | A | * | 1/2000 | Rymer | 119/162 |
| 2008/0202439 | A1 | * | 8/2008 | Lapidge et al. | 119/162 |

* cited by examiner

Primary Examiner — Rob Swiatek
Assistant Examiner — Ebony Evans
(74) Attorney, Agent, or Firm — LaMorte & Associates P.C.

(57) ABSTRACT

A system and method of customizing a flush toilet to help train an animal to utilize the toilet when making waste. A primary tray is provided. The primary tray is placed over the toilet. An opening is formed in the primary tray. If a pet in training becomes tentative, the opening is reduced in size or eliminated by the use of a supplemental tray. The supplemental tray is sized to cover only the part of the primary tray that holds litter. With the litter removed, the supplemental tray is placed atop or under the primary tray. If no opening is desired, no opening is formed. If a smaller opening is desired, an opening of the appropriate size is made in the supplemental tray. The supplemental tray is then filled with litter and is used to train an animal as if it were part of the primary tray.

11 Claims, 4 Drawing Sheets

TOILET TRAINING DEVICE FOR PETS

BACKGROUND OF THE INVENTION

1. Field of the Invention

In general, the present invention relates to devices and methods that are used to train a pet to utilize a flush toilet. More particularly, the present invention relates to devices and methods that suspend litter over the seat of a toilet to condition a pet to make waste into the toilet seat opening.

2. Prior Art Description

Many pets, and especially cats, can be trained to use a litter box. However, litter boxes must be cleaned and the litter periodically changed. Litter can be accidentally moved out of litter box by a pet and litter boxes can emit unappealing smells. It is for these reasons that many pet owners prefer options other than litter boxes.

The most obvious choice, other than a litter box, is to train a pet to go to the bathroom outside. However, for many people, such a choice is not possible. Many people do not have the time in their schedules to walk their pets at necessary times. Furthermore, many pets cannot be trained to safely roam free outdoors.

If a pet owner does not want the hassle of a litter box and cannot train a pet to go outside, the only other viable option is to train the pet to use the toilet. The way a pet is trained to use a toilet is to position the litter atop the toilet. Eventually, a pet will get into the habit of going to the bathroom atop the toilet. Over time, the amount of litter positioned atop the toilet is decreased, until little or no litter is needed to entice the pet. The pet is then trained to use the toilet and the pet's waste can be flushed away.

In the prior art, there are many litter trays that are designed to hold litter over the opening of a toilet. Such prior art devices are exemplified by U.S. Pat. No. 3,688,742 to McGee, entitled Toilet Training Assembly For Cats. Many of the prior art litter trays have openings that lead to the underlying toilet. The size of the openings can often be enlarged by removing material from the suspended litter tray. However, it has been found that pets, especially certain cats, are tentative about perching themselves atop a toilet bowl. Often, a cat may be comfortable using a litter tray provided the hole to the underlying toilet is small. As soon as a pet owner enlarges the hole, the cat may refuse to use the litter tray and the training cycle is lost. The hole cannot be reduced in size because the hole was enlarged by removing material from the litter tray. The only way a pet owner can return to the previous configuration is to purchase a new litter tray and again begin the training process.

A need therefore exists for a pet training device that can train a pet to use a toilet, where the size of the opening exposed to the toilet gradually increases. A need also exists for a pet training device where the size of the hole exposed to the underlying toilet can be decreased as well as increased in order to meet the training requirements of a particular pet. These needs are met by the present invention as described and claimed below.

SUMMARY OF THE INVENTION

The present invention is a system and method of customizing a flush toilet to help train an animal to utilize the toilet when making waste. A primary tray is provided. The tray is sized to span the opening of a toilet bowl. The primary tray is placed over the toilet bowl below the toilet seat. An opening of a first size is formed in the primary tray over the toilet bowl. If a pet in training becomes tentative due to the opening, the opening is reduced in size or eliminated by the use of a supplemental tray. The supplemental tray is sized to cover only the part of the primary tray that holds litter. With the litter removed, the supplemental tray is placed atop or under the primary tray so that the supplemental tray at least partially covers the opening in the primary tray.

If no opening is desired, no opening is formed through the supplemental tray. If a smaller opening is desired, an opening of the appropriate size is made in the supplemental tray and that smaller opening is aligned with the larger opening in the primary tray. The supplemental tray is then filled with litter and is used to train an animal as if it were part of the primary tray.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention training system can be embodied in many ways, the embodiment illustrated shows the training system configured to set upon a standard round toilet seat commonly used in the United States. This embodiment is selected in order to set forth the best mode contemplated for the invention. The illustrated embodiment, however, is merely exemplary and should not be considered a limitation when interpreting the scope of the appended claims.

Figure 1:
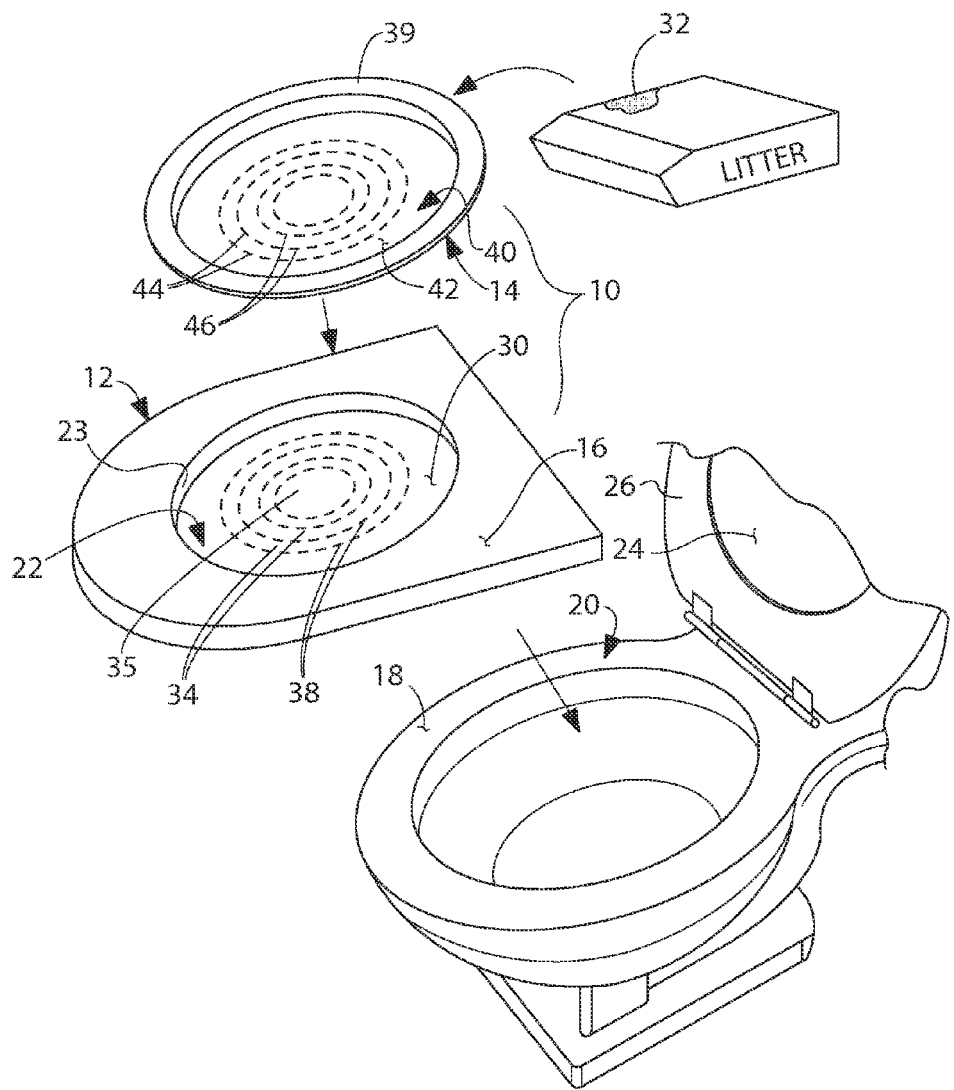
FIG. 1 is a perspective view of an exemplary embodiment of a pet training system for a toilet.
Figure 2:
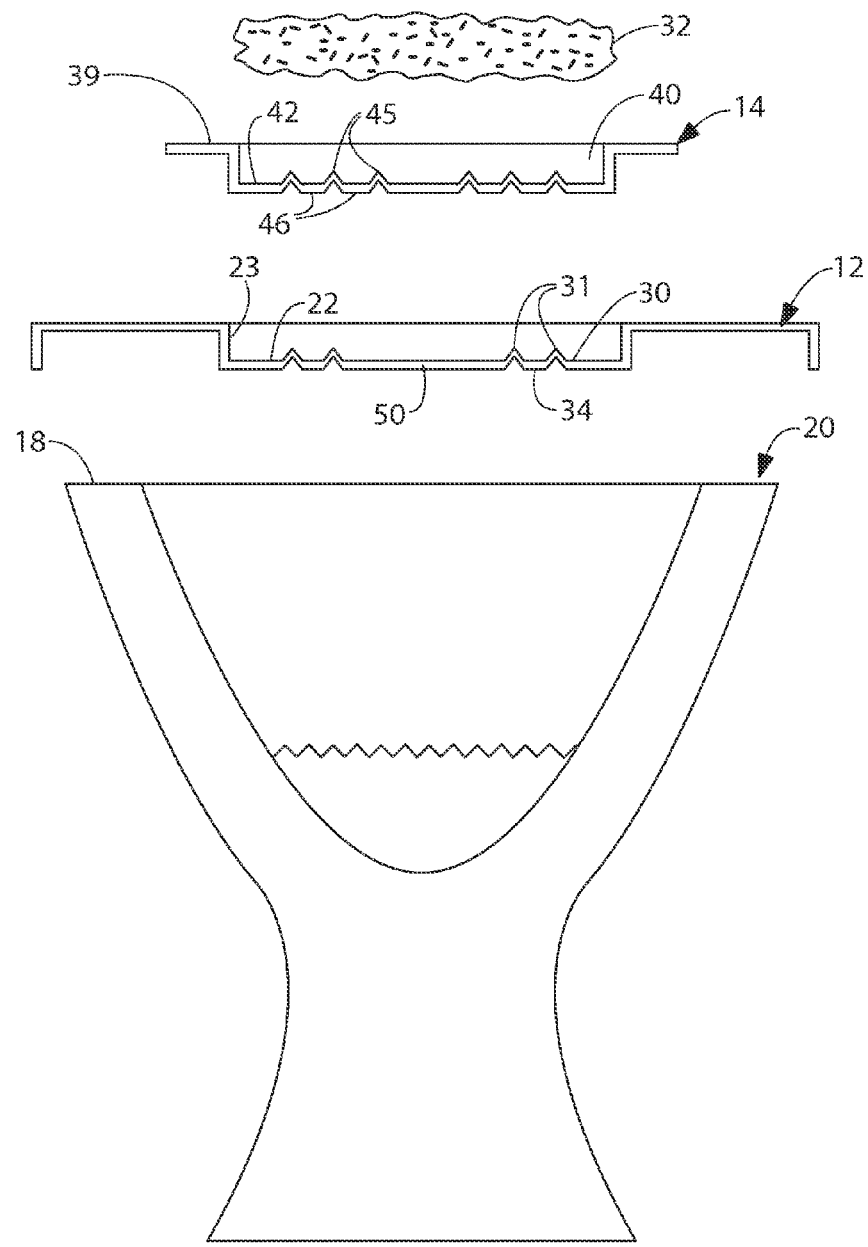
FIG. 2 is an exploded view of the embodiment of FIG. 1.
Figure 3:
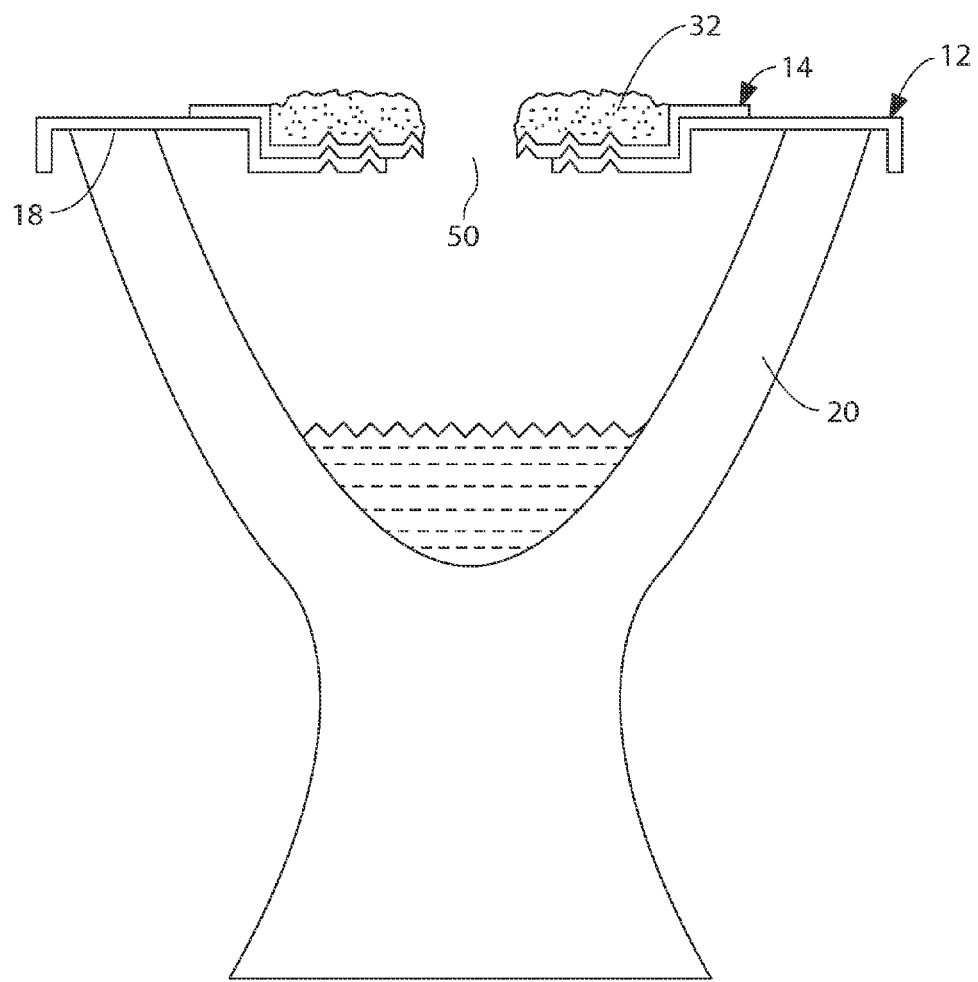
FIG. 3 is a cross-sectional view of the exemplary embodiment of FIG. 1.

Referring to FIG. 1, in conjunction with FIG. 2 and FIG. 3, the exemplary embodiment of the training system 10 is shown. The training system 10 includes a primary tray 12 and at least one supplemental tray 14. The primary tray 12 has an outer flange 16 that is sized and shaped to rest upon the porcelain rim 18 of a toilet 20. A depression 22 is formed on the primary tray 12 in the section of the primary tray 12 that rests above the center of the toilet 20. The depression 22 is defined by a continuous vertical wall 23 that descends below the principal plane of the primary tray 12. The depression 22 has bottom surface 30. The depression 22 preferably has a depth of between one and two inches. The circumference of the depression 22 is sized to be no larger than the central opening 24 of a standard toilet seat 26.

The outer flange 16 of the primary tray 12 extends from the edges of the depression 22 to the peripheral edge 28 of the primary tray 12. The outer flange 16 therefore gets interposed between the rim 18 of the porcelain toilet 20 and the bottom of the toilet seat 26 when the primary tray 12 is installed upon the toilet 20.

The depression 22 has bottom 30. Litter 32 is placed upon the bottom 30 when a pet is being trained. The continuous vertical wall 23 that defines the depression 22 hold litter 32 upon the bottom 30 and prevents litter 32 from moving out of the depression 22.

A series of perforated rings 34 are formed in the bottom 30 of the depression 22. The series of perforated rings 34 include a center disc 35 and a series of progressively larger annular rings that surround the center disc 35. Although the term "ring" is being used, it will be understood that the various rings need not be round, but rather, can be oblong or any other geometric shape. As is best seen in FIG. 2, the bottom 30 of the depression many have slight raised areas 31 that surround each of the perforated rings 34. The raised areas 31 help prevent excessive amounts of litter from inadvertently falling through an opening made by the removal of a perforated ring 34.

The primary tray 12 is made from a single piece of plastic that can be molded or vacuum formed into shape. Perforations 38 that define the peripheries of the various perforated rings 34 are stamped into the material of the primary tray 12. To remove any one of the perforated rings 34, the material between the perforations 38 is cut or torn and the ring removed.

The supplemental tray 14 is designed to sit atop the primary tray 12 and temporarily replace any or all of the perforated rings 34 that were removed from the primary tray 12. The supplemental tray 14 also defines a depression 40. The depression 40 on the supplemental tray 14 is sized and shaped to fit inside the depression 22 of the primary tray 12. A flange 39 extends radially from the top of the depression 40.

The depression 40 of the supplemental tray 14 has a generally flat bottom 42. The bottom 42 of the supplemental tray 14 has perforations 44 that define a second series of perforated rings 46. The second series of perforated rings 46 are preferably the same shape and size as perforated rings 34 on the primary tray 12. Likewise, the bottom 42 of the supplemental tray 14 has raised areas 45 that fit over the raised areas on the primary tray 22. Accordingly, when the supplemental tray 14 is placed atop the primary tray 12, the bottom 42 of the supplemental tray 14 abuts against the bottom 30 of the primary tray 12.

The present invention training system 10 is used by placing the primary tray 12 on a toilet 20 between the toilet seat 26 and the rim 18 of the porcelain toilet 20. The toilet seat 26 is closed atop the primary tray 12. The depression 22 present on the primary tray 12 aligns generally with the central opening 24 defined by the toilet seat 26. The depression 22 also defines a confined area surrounding the bottom 30.

Litter 32 is placed in the confined area. A pet is then trained to use the confined area as a litter box. After a pet gets accustomed to climbing atop a toilet seat 26 to use the litter 32, the area of litter 32 is reduced. To reduce the area of litter, the smallest of the perforated rings 34 is removed from the bottom 30 of the primary tray 12. This creates an opening 50 that is exposed to the bowl of the toilet 20. The opening 50 is left small until the pet becomes accustomed to the presence of the opening 50.

Once a pet has become accustomed to the presence of the size of the opening 50, the size of the opening 50 is increased. The size of the opening 50 is increased by removing the next perforated ring 34. As the size of the opening 50 increases, the area of litter 32 supported by the primary tray 12 decreases. As the pet gets use to each opening 50, the size of the opening 50 is increased by removing more of the perforated rings 34. Eventually, all of the perforated rings 34 are removed and the primary tray 12 no longer supports any significant volume of litter 32. Hopefully by this point, the pet has been conditioned to sit upon the toilet seat 26 and make waste through the opening 24 of the toilet seat 26. Once this conditioning is accomplished, the primary tray 12 is removed.

Each time the opening 50 in the primary tray 12 is increased in size, there is a chance that the pet being trained will refuse to use the litter 32 supported by the primary tray 12. At any time, a pet may just consider the opening 50 in the primary tray too large to navigate. This may happen if a pet being trained accidentally steps through or otherwise falls into the existing opening 50. If this occurs, often the only way to get the pet to continue training is to reduce or eliminate the opening 50 in the primary tray 12 until the pet again gains its confidence.

In order to reduce the size of the opening 50 in the primary tray 12, the supplemental tray 14 is used. If ever the opening in the primary tray 12 is to be closed or reduced, the litter 32 is first removed from the primary tray 12. The supplemental tray 14 is then placed atop the primary tray 12 so that the flat central area 30 of the primary tray 12 touches the flat central area 42 of the supplemental tray 14. If no opening 50 is desired, no perforated ring 46 is removed from the supplemental tray 14. If a smaller opening 50 is desired, only one or a few of the perforated rings 46 are removed from the supplemental tray 14. Litter 32 is then placed atop the supplemental tray 14 as if the supplemental tray 14 were part of the primary tray 12.

It will be understood that by using the primary tray 12, the opening 50 can be gradually made larger. By using the supplemental tray 14, the opening 50 can be made smaller, or even closed. Having the ability to both increase and decrease the opening 50 makes the training system 10 far more versatile and effective than prior art training systems.

Figure 4:
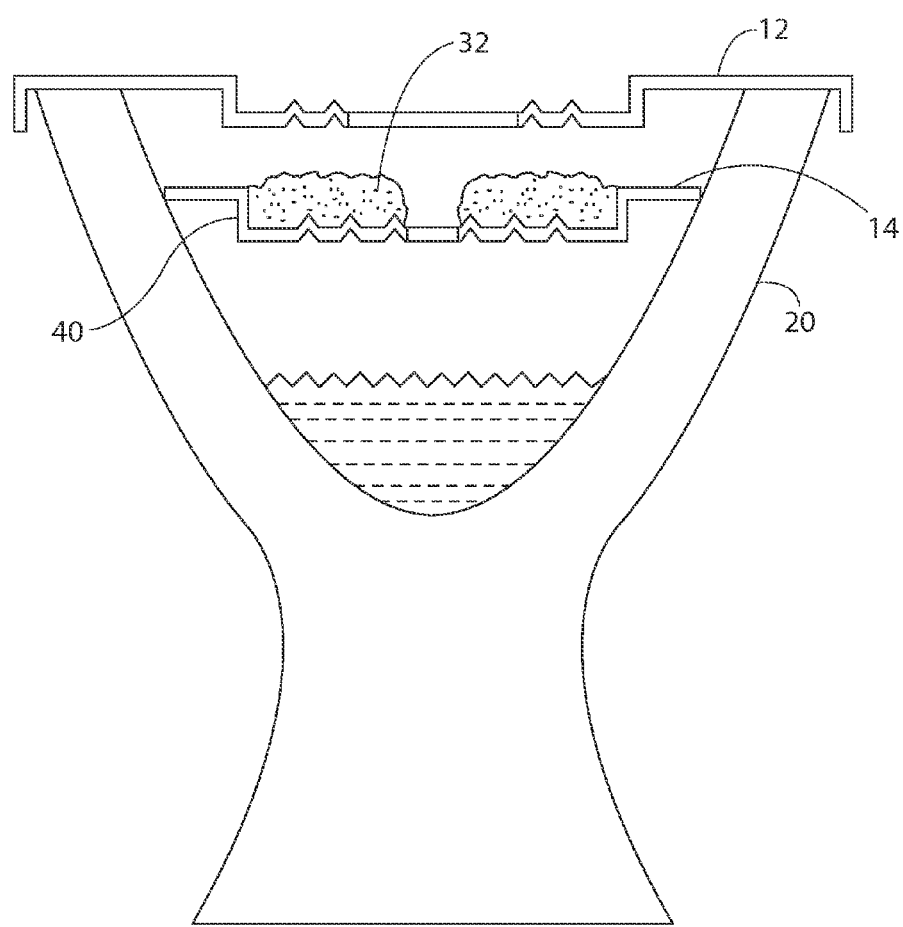
FIG. 4 is a toilet configured for pet training using only the supplemental tray.

Referring now to FIG. 4 in conjunction with FIG. 2, it can be seen that the supplemental tray 14 can be also used for training by placing it in the toilet 20 under the primary tray 12.

If a pet owner finds that a pet is tentative in using the primary tray 12 because is defines a hole that is too large, the supplemental tray 14 can be placed in the toilet 20 below the primary tray 14. The depression 40 in the supplemental tray 14 is filled with litter 32. The supplemental tray 14 fits within the bowl of the toilet 20. The presence of the supplemental tray 14 prevents a pet from seeing the water in the toilet 20. Furthermore, the supplemental tray 14 rests far closer to the primary tray 12 than does the water. Accordingly, the drop perceived by the pet under the primary tray 12 is significantly reduced.

It will be understood that the embodiment of the present invention that is illustrated and described is merely exemplary and that a person skilled in the art can make many variations to that embodiment. For instance, the shape of the primary and supplemental trays can be altered to match different toilet types. Furthermore, the number and size of perforated rings on both the primary tray and the supplemental tray can be altered. All such embodiments are intended to be included within the scope of the present invention as defined by the claims.

What is claimed is:

1. A method of customizing a toilet of the type having a bowl and seat, to train an animal to utilize said toilet when making waste, said method comprising the steps of:

providing a primary tray;

placing said primary tray over said bowl, below said seat, wherein said primary tray has a first depression and said first depression has a first bottom surface that is perforated to form a first plurality of removable sections;

forming an opening of a first size in said primary tray over said bowl by removing at least one of said first plurality of removable sections;

providing a supplemental tray, wherein said supplemental tray has a second depression and said second depression has a second bottom surface that is perforated to form a second plurality of removable sections;

aligning said supplemental tray with said primary tray, wherein said supplemental tray at least partially obstructs said opening of said first size.

2. The method according to claim 1, further including the step of placing litter within said supplemental tray.

3. The method according to claim 1, wherein said second depression of said supplemental tray is shaped and sized to fit within said first depression of said primary tray.

4. The method according to claim 3, wherein said second depression of said supplemental tray extends into said first depression of said primary tray when said supplemental tray is placed atop said primary tray.

5. The method according to claim 1, further including the step of forming an opening of a second size in said supplemental tray that is smaller than said opening of said first size in said primary tray.

6. The method according to claim 5, wherein said step of forming an opening of a second size includes removing at least one of said removable sections from said supplemental tray.

7. In an animal toilet training configuration having a tray of litter with a first depression that holds a volume of litter, wherein said tray of litter is suspended over a bowl of a toilet and an opening of a first size is formed through said tray, a method of selectively reducing said opening, said method comprising the steps of:

providing a supplemental tray with a second depression having a bottom surface, wherein said bottom surface is perforated to form a plurality of removable sections;

placing said supplemental tray directly atop said tray of litter, wherein said supplemental tray abuts said tray of litter and at least partially obstructs said opening of said first size; and placing litter atop said supplemental tray.

8. The method according to claim 7, wherein said first depression is sized and shaped to receive said second depression.

9. The method according to claim 8, wherein said first depression of said tray of litter receives said second depression of said supplemental tray when said supplemental tray is placed atop said tray of litter.

10. The method according to claim 7, further including the step of forming an opening of a second size in said supplemental tray that is smaller than said opening of said first size in said tray of litter.

11. The method according to claim 10, wherein said step of forming an opening of a second size includes removing at least one of said removable sections from said depression of said supplemental tray.

\* \* \* \* \*